Patented July 27, 1926.

1,593,669

UNITED STATES PATENT OFFICE.

LEO T. PEDEN, OF HOUSTON, TEXAS.

PAVING.

No Drawing.    Application filed September 3, 1924. Serial No. 735,708.

This invention relates to an improved type of paving, and embodies also the process of producing and laying the same.

In the making of permanent roadways surfaced with mixtures of aggregate and bitumen, it has been found that these mixtures made from artificial or natural asphalts, when laid upon the roadway are of great value in resisting weight and displacement due to the aggregate contained therein, and will preserve the roadbed for long periods. Such roads are, however, subject to wear and abrasion.

Experience has shown also that natural rock asphalt, particularly lime rock asphalt, has a marked superiority over other bituminous materials in resisting abrasion such as is produced by traffic. When used alone, however, it is found to be somewhat lacking in stability and is more easily displaced than the asphaltic concrete ordinarily produced. Limestone rock asphalt or bituminous rock, as found in nature is a fossiliferous deposit thoroughly and intimately united with bitumen of great hardness, the bitumen having lost most of its volatile constituents. When finely ground, it forms a meal at atmospheric temperatures which will not readily adhere to an aggregate in roadmaking. For that reason it has not been previously employed in combination with rock in making of roadbeds.

One object of the invention is to produce a paving of the character described formed of aggregate and having the voids in the aggregate wholly or partly filled with a mortar, produced from natural rock asphalt.

Another object of the invention is to produce a paving of the character described which is composed of aggregate which is coated as hereinafter stated, with a bituminous coating, and having the voids in the aggregate entirely or partly filled with a mortar composed of ground or crushed natural rock asphalt with which there is mixed a sufficient amount of fluxing oil to render the same more pliable, or elastic, as hereinafter described.

A further feature of the invention is to provide a paving which will be comparatively cheap in production, and which will be durable and not liable to crack under varying conditions of temperature and which will not be easily displaced or become rough or undulating.

With the above and other objects in view, this invention has particular relation to certain novel features of construction, and process of production, as hereinafter more particularly set forth.

The pavement may be laid on any suitable base, the nature of the base depending on surrounding conditions; and also may be laid either hot or cold.

The aggregate used may be either what is commonly known as pit, or crusher run aggregate, or may be a suitable mixture of aggregate, so graded and mixed as to reduce the percentage of voids in the mixture. This aggregate gives body, stability and wearing qualities to the pavement, and also renders it more substantial from a mechanical standpoint. Said aggregate may constitute approximately 55% to 80% of the mixture.

The aggregate, whichever kind is used, is first coated with a bitumen. This may be done by mixing the aggregate with a bituminous coating material. This coating material may, if desired, be treated with a solvent, or bituminous flux so as to produce a coating material of suitable consistency and bituminous content. This is done in a mixer; or the aggregate may be coated by mixing it with a solvent such as naphtha, and then mixing therewith finely ground rock asphalt. The solvent will penetrate the aggregate and having a strong affinity for asphalt will cause the aggregate to absorb sufficient of the bitumen to thoroughly coat the same; or the aggregate may be coated with a finely ground rock asphalt to which a flux has been added.

The coating operation is accomplished in any conventional type of mixing machine, and the aggregate may be so treated while hot or cold, with the coating, material either hot or cold.

The aggregate is then thoroughly mixed with a mortar composed of a rather finely ground natural rock asphalt. If found desirable this natural rock asphalt may be treated with a bituminous flux or solvent to give it the required elasticity to prevent cracking of the paving. The paving material is now ready to be laid.

The paving material as produced in either manner hereinbefore described, may be laid and completed by either of the following methods:

A mixture, as described, may be spread on a prepared base and thoroughly rolled and then coated with liquid bitumen over which fine aggregate is spread and rolled in either by a roller or by traffic; or A mixture, as described, is spread on a prepared base, and thoroughly rolled after which the surface voids are filled with a finely ground rock asphalt, either hot or cold, and either treated or untreated and the topping is compacted by rolling the same, or by traffic; or, A mixture, as described, is spread on a prepared base, and thoroughly rolled, preferably with a heavy power roller. It is then covered with a sheet of finely ground rock asphalt, either hot or cold, and either treated or untreated, and the entire paving is again thoroughly rolled; or, A mixure, as described, is spread on a prepared base. The mixture is then rolled with a light hand roller. A sheet of finely ground rock asphalt, either hot or cold, and either treated or untreated, is then spread in a sheet over the paving surface and the entire paving then rolled with a heavy power roller; or, A mixture, as described, is spread on a prepared base. A sheet of finely ground rock asphalt, treated or untreated, is then spread over the surface in either hot or cold condition, and the whole compacted by rolling the same with a heavy power roller.

What I claim is:—

1. A paving formed of aggregate coated with bitumen, and a mortar formed of a mixture of crushed rock asphalt and a solvent within all the voids in the aggregate.

2. The process of producing a paving consisting of mixing aggregate with bitumen to coat the aggregate with the bitumen, then mixing with said coated aggregate a crushed rock asphalt mortar so as to form in the voids in the aggregate a binder for the aggregate, then laying the mixture.

3. The process of producing a paving consisting of heating aggregate, and mixing the same with bitumen to coat said aggregate with the bitumen, then mixing the coated aggregate with a mortar, formed of crushed rock asphalt, mixed with a bituminous flux, then laying the mixture on a suitable paving foundation.

4. The process of producing a paving consisting of coating aggregate with a solvent and mixing therewith finely ground rock asphalt to coat the aggregate with said asphalt, then mixing with the coated aggregate a mortar formed of crushed rock asphalt to form a binder in the voids in the aggregate, then laying the mixture on a suitable paving foundation.

In testimony whereof, I have signed my name to this specification.

LEO T. PEDEN.